United States Patent [19]

Heintz

[11] Patent Number: 4,483,462

[45] Date of Patent: Nov. 20, 1984

[54] WATER GUARD

[75] Inventor: Lawrence T. Heintz, Covington, La.

[73] Assignee: Texas Industries, Inc., Dallas, Tex.

[21] Appl. No.: 396,066

[22] Filed: Jul. 7, 1982

[51] Int. Cl.³ ............................................. G01G 17/04
[52] U.S. Cl. ........................................ 222/63; 141/87;
222/75; 222/77; 222/108; 222/526
[58] Field of Search .................... 141/86, 87; 137/312,
137/313; 177/116, 132, 133; 222/52, 63, 77, 74,
75, 108, 109, 318, 424, , 526, 538, 566, 575;
414/21, 328

[56] References Cited

U.S. PATENT DOCUMENTS

| 2,922,610 | 1/1960 | Bale | 177/116 |
|---|---|---|---|
| 3,472,329 | 10/1969 | Smith | 177/132 X |
| 3,532,252 | 10/1970 | Brock | 222/52 |
| 3,666,119 | 5/1972 | Parsons | 414/328 |
| 4,174,742 | 11/1979 | Murphey | 141/87 X |
| 4,337,802 | 7/1982 | Kennedy et al. | 141/87 X |

Primary Examiner—Joseph J. Rolla
Assistant Examiner—Lawrence J. Miller
Attorney, Agent, or Firm—Richards, Harris & Medlock

[57] ABSTRACT

A water guard system is used in a gravel loadout structure wherein wet bulk material is stored in a bin (12) and released through a gate (14). Runoff water from the bulk material tends to leak through the gate (14) and drip on an underlying scale (22) as well as on trucks which enter the structure (10) for loading. A trough (28) is supported on rails (80, 104) and is driven by an air cylinder (30). The gate (14) is open and closed by operation of an air cylinder (108). In an extended position the trough (28) is positioned beneath the gate (14) to collect runoff water and pass this water into a sump (38) which delivers it through a drain line (40). The trough (28) is retracted by operation of the air cylinder (30) to permit the gate (14) to be opened and load a truck positioned beneath the gate. When the gate (14) is closed the trough (28) is returned to the extended position by operation of the cylinder (30). A control circuit (114) operates a plurality of solenoid valves which serve to position the trough (28) and open and close the gate (14).

18 Claims, 7 Drawing Figures

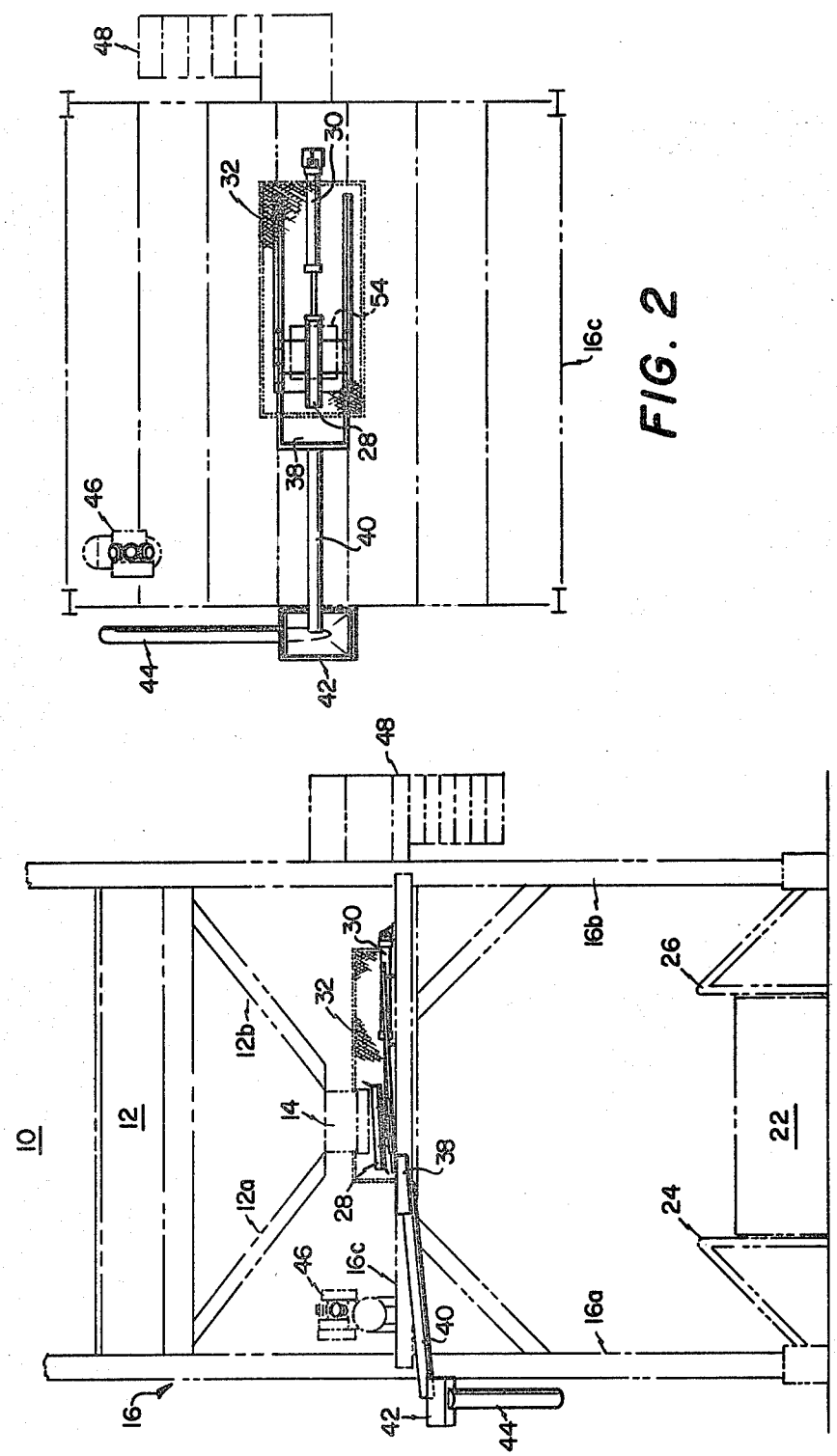

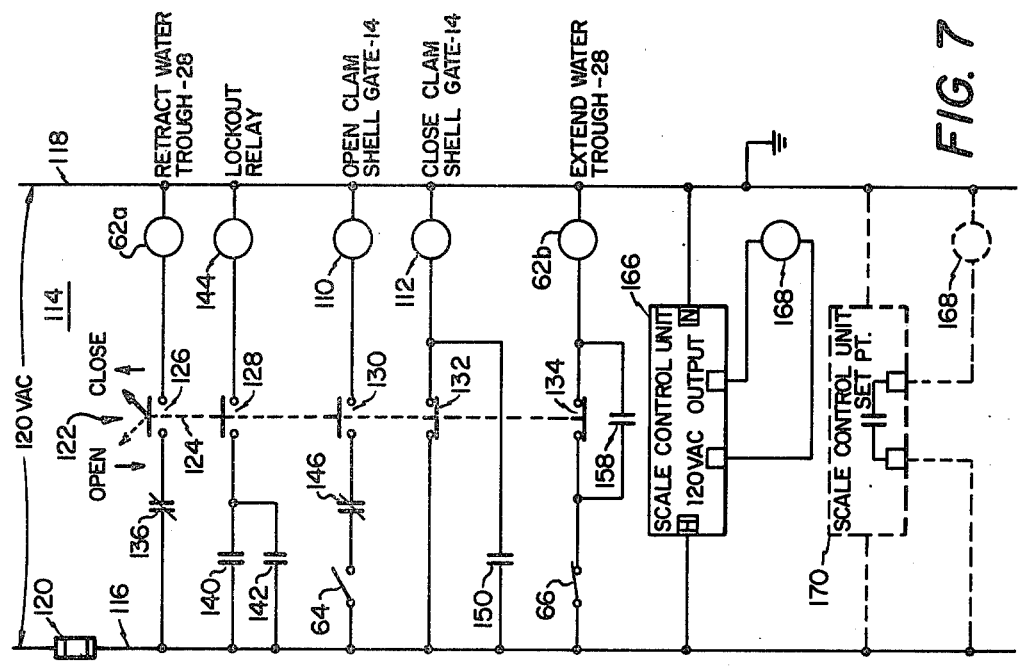
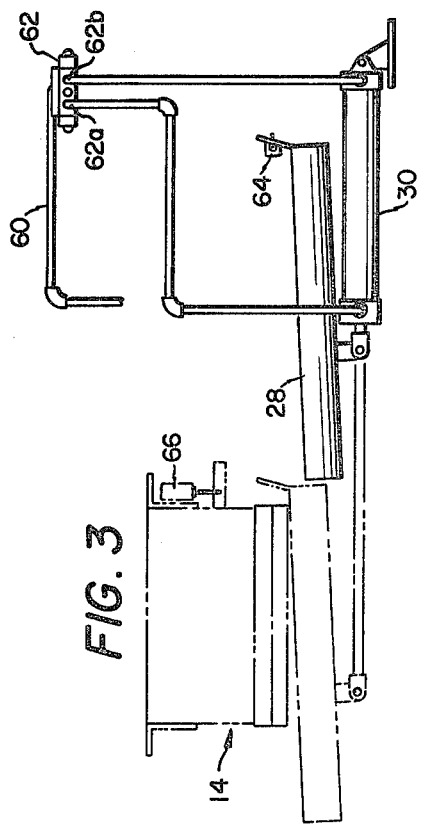
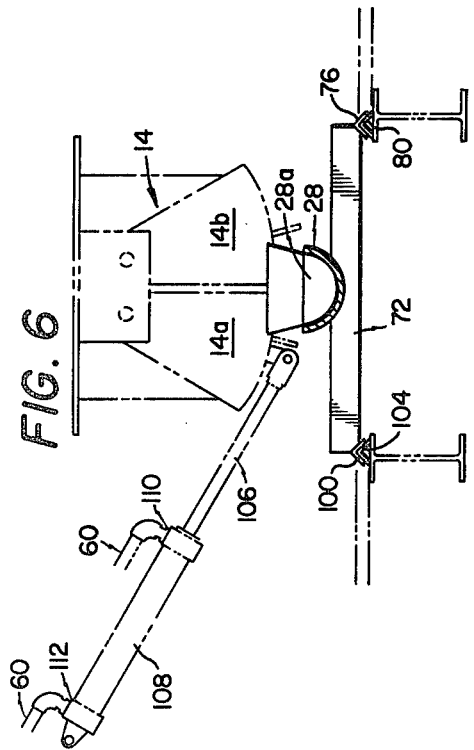

WATER GUARD

TECHNICAL FIELD

The present invention pertains in general to the loading of bulk material and more specifically to apparatus to guard against the dripping of water from a storage bin holding the bulk material.

BACKGROUND OF THE INVENTION

Concrete trucks are typically loaded with aggregate, stone, sand and gravel from an elevated storage bin. Clam shell doors at the bottom of the bin are opened and closed to permit a gravity feed of the bulk material into the vehicle. The vehicle is typically parked on a scale to measure the weight of the material which is loaded into the truck.

The bulk material in most cases is washed and remains wet while in the storage bin. This results in a flow of free water through the clam shell gate onto the scales and onto any vehicle which is driven beneath the bin. This flow of water from the storage bin causes the scales to be wet and tends to increase rust and corrosion. The dripping water also causes the trucks to be dirty. The need to clean the water from the scales and the surrounding work area and to clean the trucks adds to the cost of the operation.

In view of the above problems there exists a need for a reliable as well as effective method and apparatus for preventing the leakage water from the storage bin from dripping on vehicles, scales and work area.

SUMMARY OF THE INVENTION

In a selected embodiment of the present invention there is provided a water guard for use in conjunction with a storage bin having a gate for the release of bulk material from the bin. The water guard includes a trough, means for supporting the trough in a first position aligned beneath the gate and in a second position offset from beneath the gate and means for moving the trough between the first and second positions.

BRIEF DESCRIPTION OF THE DRAWINGS

For a more complete understanding of the present invention and the advantages thereof, reference is now made to the following description taken in conjunction with the accompanying Drawings in which:

FIG. 1 is an elevation view of a gravel loadout bin which incorporates the water guard of the present invention;

FIG. 2 is a plan view of the hopper platform shown in FIG. 1;

FIG. 3 is an elevation view showing the water trough of the present invention in both an extended position and a retracted position in relation to a clam shell gate;

FIG. 6 is a section view taken along lines 6—6 in FIG. 4; and

FIG. 7 is an electrical schematic diagram showing the operation of the relays and solenoids for controlling the retractable trough and clam shell gate shown in the above listed figures.

DETAILED DESCRIPTION OF THE INVENTION

Figure 4:
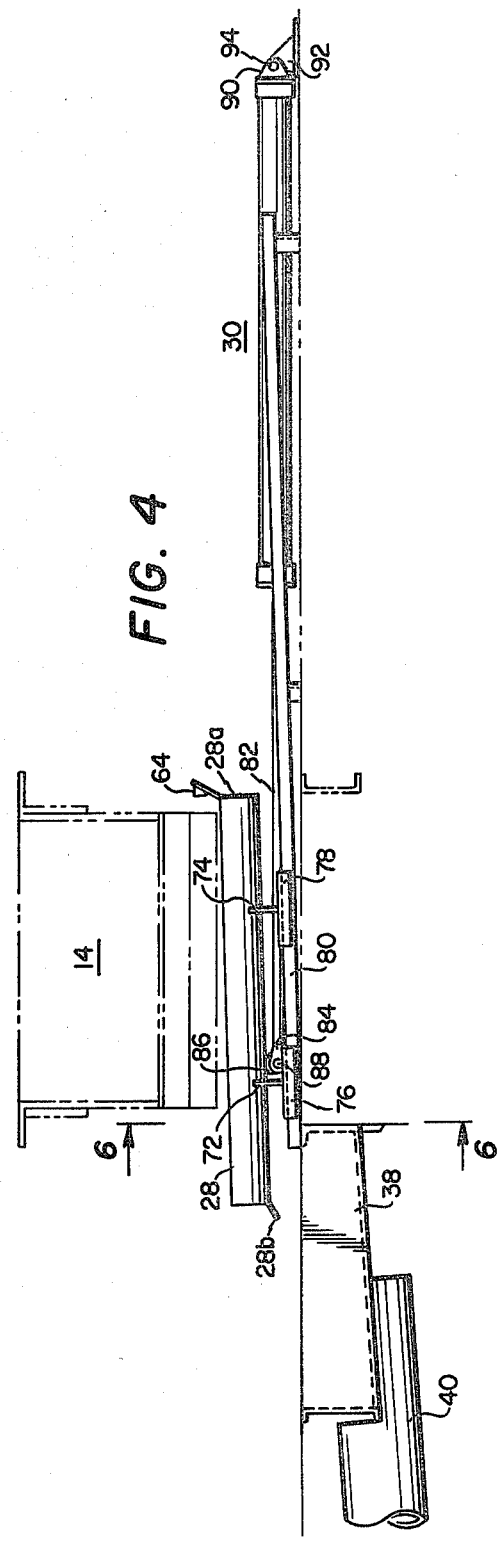
FIG. 4 is a detailed elevation view of the water trough and air cylinder of the present invention.

Referring now to FIG. 1 there is illustrated a gravel loadout structure 10 which includes an elevated storage bin 12. At the lower end of the storage bin 12 there are sloping walls 12a and 12b which direct bulk material from the bin 12 into a clam shell gate 14.

The storage bin 12 and its associated equipment are supported by a frame 16 which includes vertical supporting beams 16a and 16b. The frame further includes a horizontal structure 16c.

Between the beams 16a and 16b there is located a truck scale 22 which serves to weight the contents received from the bin 12 and placed in a truck which is parked on the scale. On each side of the scale 22 there are provided bump rails 24 and 26.

Immediately below the gate 14 there is a water trough 28 which is positioned by operation of an air cylinder 30. The water trough 28 is shown in the extended position immediately below the gate 14. The water trough 28 and air cylinder 30 together with associated mechanisms are enclosed by an expanded metal safety guard 32.

The trough 28 is tilted slightly from the horizontal so that the runoff water collected by the trough empties into a first water sump 38. A drain line 40 carries water away from the sump 38. A second water sump 42 collects the runoff water that is passes through the drain line 40. A drain line 44 carries water away from the sump 42. The drain line 44 carries water to a location outside of the frame 16.

The clam shell gate 14 and the air cylinder 30 are driven by compressed air which is produced by an air compressor 46 that is mounted on the structure 16c.

Access to the equipment located on the structure 16c is provided by a staircase 48 which is connected to the frame 16.

Bulk material, such as washed sand and gravel, is stored in the bin 12 and directed through the gate 14 to be loaded onto a truck which is parked on the scales 22. When the bulk material is being loaded, the trough 28 is in a retracted position which is below and to the side of the gate 14. When the gate 14 is closed, there is a tendency for water to leak through the gate and drip onto the scales 22 and onto any vehicle parked on the scales. This water is runoff from the wet bulk material stored in the bin 12. The dripping water from the gate 14 can damage the scales 22 and produce a dirty surface for the trucks. Further, the dripping water, which is frequently dirty, can mar the trucks waiting to be loaded with bulk material. The trough 28 serves to collect this dripping water and direct it to the sump 38, through the line 40 to the sump 42 and out through the line 44. This removes the water from the loading area which helps to keep the loading area clean and dry and prevent dirtying the transport trucks.

Refer now to FIG. 2 for a plan view of the hopper platform for the gravel loadout structure 10. The clam shell gate 14 opening is shown by dotted lines 54. Note that the trough 28 is positioned at the center line of the opening of the clam shell gate 14. Most of the water leakage from the bin 12 is through the center of the gate 14. Thus, the trough 28 can be substantially smaller than the full width of the opening 54.

Refer now to FIG. 3 for an elevation view showing the positions and air connections for the trough 28 and air cylinder 30. The water trough 28 is shown in the retracted position in solid lines and is shown in the extended position in phantom lines.

Compressed air from the air compressor 46 is delivered through a line 60 to a double acting solenoid 62 having valves 62a and 62b. The valves 62a and 62b are connected to opposite ends of the air cylinder 30. By selectively directing the compressed air to opposite ends of the cylinder 30 the trough 28 is moved to the extended and retracted positions.

The trough 28 includes a limit switch 64 which is mounted at the top of the trough on the end thereof adjacent to the cylinder 30. The switch 64 is activated when the trough 28 reaches the desired extended position.

The clam shell gate 14 also includes a limit switch 66 which indicates the position of the clam shell doors of the gate 14.

Refer now to FIG. 4 for a detailed elevation view of the trough 28 and air cylinder 30. The trough 28 is supported by struts 72 and 74. The struts 72 and 74 are in turn supported by skids 76 and 78 respectively as well as other skids shown in FIG. 5. The skids 76 and 78 rest on a rail 80.

The trough 28 comprises a half cylinder which is closed at one end with a plate 28a and is provided with a downward slanted lip 28b at the opposite end. The lip directs the water from the trough 28 into the sump 38.

The air cylinder 30 has an interior piston (not shown) which is connected to a rod 82 which has a clevis 84 joined to one end thereof. A lug 86 is joined to the bottom of the trough 28. A pin 88 connects the clevis 84 to the lug 86.

The cylinder 30 has a base clevis 90 joined for support at one end. A lug 92 is fixed to the frame 16 and connected to the clevis 90 by means of a pin 94.

Figure 5:
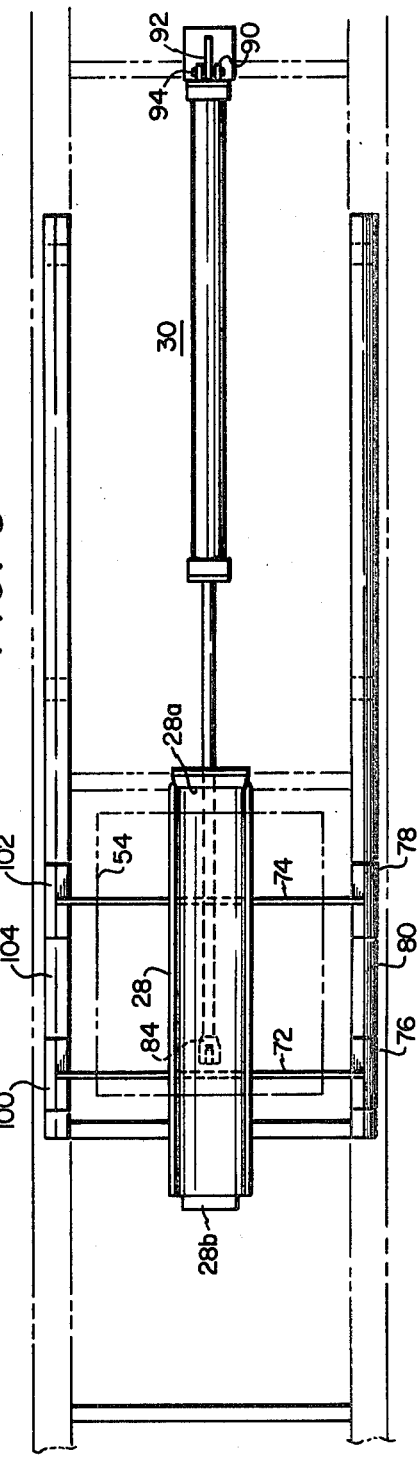
FIG. 5 is a plan view of the water trough, air cylinder, skids and rails for the present invention.

A plan view of the trough 28 and cylinder 30 together with associated apparatus is illustrated in FIG. 5. The struts 72 and 74 are further connected to skids 100 and 102 which are supported by a rail 104. Note that the trough 28 is situated to travel along the center line of the clam shell gate 14 by riding on the rails 80 and 104.

Referring now to FIG. 6 there is illustrated a section view taken along lines 6—6 in FIG. 4. Note that the clam shell gate 14 includes doors 14a and 14b. The door 14a is operated by means of a rod 106 which is driven by a double acting air cylinder 108. The gate 14 is opened by operation of a solenoid valve 110 and closed by operation of a solenoid valve 112. The valves 110 and 112 are connected between the air line 60 and the air cylinder 108.

Typical water leakage from the bin 12 is passed through the longitudinal contiguous edges of the doors 14a and 14b of the gate 14. This is at the center line of the gate 14. Note that the trough 28a is located below this center line position. Note further that the skids 76, 78, 100 and 102 and rails 80 and 104 comprise angle iron members.

An electrical schematic diagram of a control circuit 114 for the present invention is shown in FIG. 7. Operating power is supplied between lines 116 and 118 with protection provided by a fuse 120 which is installed serially in line 116. Line 118 is the ground. A 120 volt AC supply is provided between the lines 116 and 118. An operator controlled switch 122 has open and close positions which correspond to the required position of the gate 14. The switch 122 has a common shaft 124 connected to electrical contact sets 126, 128, 130, 132 and 134. Contact sets 126, 128 and 130 make contact when the switch 122 is in the open state and are open when switch 122 is in the closed state. The contact sets 132 and 134 make contact when the switch 122 is in the closed state and are open when the switch 122 is in the open state.

A capacitor 136 is connected between line 116 and a first terminal of the contact set 126. The solenoid valve 62a is connected between a second terminal of the contact set 126 and line 118. The solenoid valve 62a functions to cause the trough 28 to retract.

Capacitors 140 and 142 are connected in parallel between line 116 and a first terminal of the contact set 128. A relay 144 is connected between a second terminal of the contact set 128 and line 118. This relay serves as a lockout.

The limit switch 64 is connected between line 116 and a first terminal of a capacitor 146. The second terminal of capacitor 146 is connected to a first terminal of the contact set 130. The solenoid valve 110 is connected between line 118 and a second terminal of the contact set 130. The solenoid valve 110 serves to drive the rod 106 to open the clam shell gate 14.

A first terminal of contact set 132 is connected directly to line 116. A capacitor 150 is connected between a second terminal of contact set 132 and line 116. The solenoid valve 112 is connected between the second terminal of contact set 132 and line 118. The solenoid valve 112 provides air pressure to close the clam shell gate 14.

A first terminal of the limit switch 66 is connected to line 116 and a second terminal is connected to a first terminal of the contact set 134. A capacitor 158 is connected in parallel with the terminals of contact set 134. The solenoid valve 62b is connected between the second terminal of contact set 134 and line 118. The solenoid valve 62b serves the purpose of activating cylinder 30 to cause the trough 28 to move to the extended position beneath the gate 14.

A scale control unit 166 is connected between lines 116 and 118. This unit produces an output through a coil 168 which serves to activate the solenoid valve 112, when a predetermined load on the scale has been reached, to close the gate 14.

A scale control unit set point device 170 is connected between lines 116 and 118. The device 170 is utilized to set the predetermined weight that causes activation of the coil 168.

Operation of the water guard system of the present invention is now described in reference to the FIGURES. When there is no vehicle present on the scale 22, the switch 122 is set to the close position to maintain the clam shell gate 14 closed. Under this condition the limit switch 66 is closed, the contact set 134 is closed and the solenoid valve 62b is activated. This serves to apply compressed air to the right-hand side of the air cylinder 30 which causes the trough 28 to move to the extended position beneath the gate 14. The system remains in this condition until other commands are applied. In this position the trough 28 collects runoff water from the bin 12 and directs this water into the sump 38 where it then drains through line 40 into the sump 42 and then is directed through the line 44 to be deposited outside of the frame 16. This ensures that the scale 22, the loading area and any associated vehicles are not soiled by the runoff water from the washed bulk material.

In the next step, a truck is positioned on the scale 22 in such a position to receive bulk material through the gate 14. When the truck is ready to receive material, the operator moves the switch 122 to the open position. This activates the solenoid valve 62a which causes the trough 28 to be withdrawn to the retracted position. When the trough 28 is fully retracted, the limit switch 64 is closed which causes the solenoid valve 110 to release air to open the clam shell gate 14. This permits the bulk material to be transferred from the storage bin 12 to the truck parked on the scales 22.

When the desired weight of bulk material has been loaded into the truck, the solenoid coil 168 is activated which serves to energize the solenoid valve 112 which acts to close the clam shell gate 14 by operation of air cylinder 108. When the gate 14 returns to the closed position, the limit switch 66 closes thereby activating the solenoid valve 62b which causes the trough 28 to be moved back into the extended position beneath the gate 14. Thus, after the loading operation is completed, the trough is again in position to catch the runoff water from the gate 14. The truck can then be removed from beneath the storage bin 12 without encountering dripping water from the bulk material.

At any time the operator can move the switch 122 from the open to the close position which will close the clam shell gate 14 by operation of solenoid valve 112 which will in turn cause the trough 28 to move to the extended position by operation of the solenoid valve 62b. This closing is independent of the output from the scale control unit 166.

In summary, the present invention comprises a method and apparatus for automatically guarding against dripping of runoff water from washed bulk material which is to be loaded into a truck. A trough is positioned beneath a gate when the gate is closed but is automatically retracted immediately before the opening of the gate. Immediately after the closing of the gate the trough is automatically extended to return beneath the gate and again collect the runoff water.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

I claim:

1. A method of operation for a water guard wherein a vehicle is loaded with bulk material passed through a gate from a storage bin and wherein there tends to be water leakage through said gate, the method comprising the steps of:

positioning a trough supported by left and right downward extending skids which slide on parallel rails to beneath said gate, when said gate is closed, to receive water leaking through said gate wherein said parallel rails are positioned below and offset on opposite sides from said gate; and retracting said trough from beneath said gate to permit said gate to open and pass said bulk material to said vehicle between said parallel rails.

2. A method as recited in claim 1 including a step of receiving water from said trough into a sump and directing the water through a drain line from said sump.

3. A method of operation for a water guard wherein a vehicle is loaded with bulk material through a clam shell gate from a storage bin and wherein there tends to be water leakage through the gate, the method comprising the steps of:

positioning a trough supported by left and right downward extending skids which slide on parallel rails to beneath said clam shell gate to receive water leaking through said gate, wherein said parallel rails are positioned below and offset on opposite sides from said gate;

positioning a vehicle beneath said clam shell gate, said trough preventing water from dripping from said clam shell gate onto said vehicle;

retracting said trough from beneath said clam shell gate after the step of positioning said vehicle;

opening said clam shell gate to load said bulk material downward between said parallel rails into said vehicle after said step of retracting said trough;

closing said clam shell gate to stop the transfer of said bulk material to said vehicle; and returning said trough to beneath said clam shell gate, after the step of closing said clam shell gate, to receive water leaking through said clam shell gate thereby preventing water from dripping on said vehicle.

4. A method as recited in claim 3 including a step of receiving an operator command to sequentially initiate the steps of retracting said trough and opening said clam shell gate.

5. A method as recited in claim 3 wherein the step of positioning said vehicle includes positioning said vehicle on a scale for weighing the contents of said vehicle, said method including the step of generating a command in response to said scale measuring that said vehicle has received a predetermined weight of said bulk material, said command sequentially initiating the steps of closing said clam shell gate and returning said trough to beneath said clam shell gate.

6. A method as recited in claim 3 wherein the steps of positioning a trough, retracting said trough and returning said trough comprise applying compressed air to an air cylinder having a piston and rod with the rod connected to said trough.

7. A water guard for use in conjunction with a storage bin having a gate for the release of bulk material from the bin, the water guard comprising:

a trough having left and right downward extending skids offset from the center line of said trough, said skid supporting said trough;

first and second rails for supporting said trough in a first position beneath said gate and in a second position offset from beneath said gate, said rails extending below and offset on opposite sides from said gate, said rails respectively supporting said left and right skids; and means for moving said trough between said first and said second positions.

8. A water guard as recited in claim 7 wherein said trough is a semi-cylinder open at one end and closed at the opposite end.

9. A water guard as recited in claim 7 wherein said means for moving comprises a double acting air cylinder having a piston and rod wherein the rod is connected to said trough.

10. A water guard as recited in claim 7 wherein said trough has the longitudinal axis thereof tilted from the horizontal.

11. A water guard as recited in claim 10 including a sump for collecting runoff water from the lower end of said trough, said sump located opposite said gate from said means for moving said trough, and a drain line for carrying said runoff water from said sump.

12. A water guard for use in conjunction with a bin having a clam shell gate for the release of bulk material from the bin, the water guard comprising:
   a half cylinder trough having a pair of downward extending skids affixed thereto, said skids equally offset from the center line of said trough, said trough positionable to receive water draining from said bulk material through said clam shell gate;
   a pair of parallel rails adapted to receive said skids for supporting said trough and permitting movement of said trough along said rails, said rails positioned below and oppositely offset from said gate; and
   an air operated cylinder having a piston and rod wherein said trough is connected to said rod, said cylinder connected to receive pressurized air for positioning said trough in a first position beneath said gate and in a second position offset from beneath said gate.

13. A water guard as recited in claim 12 wherein said trough is tilted and including a sump for receiving runoff water from the lower end of said trough, said sump located opposite said gate from said air operated cylinder and further including a drain for directing water from said sump.

14. A water guard system for use in loading a vehicle with bulk material which is received through an air operated gate from a storage bin wherein water tends to leak through said gate, the water guard system comprising:
   a trough having a first end thereof blocked and said trough tilted to have the second end thereof lower than said first end;
   left and right skids extending downward from said trough and offset from the center line of said trough, said skid supporting said trough;
   first and second rails for supporting said skids below said bin, said first and second rails extending below and offset from said gate;
   means for moving said trough between a first position aligned below said gate for collecting water running therethrough and a second position below and offset from said gate to permit loading of said bulk material through said gate, between said rails and into said vehicle; and
   means responsive to a first command for activating said means for moving to transfer said trough from said first to said second position followed by opening said gate and responsive to a second command for closing said gate followed by transferring said trough from said second position to said first position.

15. A water guard system as recited in claim 14 wherein said trough is a semi-cylinder.

16. A water guard system as recited in claim 14 wherein said means for moving comprises a double acting air cylinder having a piston and a rod wherein the rod is connected to said trough.

17. A water guard system as recited in claim 14 including a sump for receiving runoff water from said trough, said sump located opposite said gate from said means for moving said trough, and a drain line for carrying said runoff water from said sump.

18. A water guard system as recited in claim 14 including a scale for supporting said vehicle to measure the load of said bulk material and generate said second command upon reaching a predetermined load.

* * * * *

UNITED STATES PATENT AND TRADEMARK OFFICE
CERTIFICATE OF CORRECTION

PATENT NO.    : 4,483,462
DATED         : November 20, 1984
INVENTOR(S)   : Heintz It is certified that error appears in the above-identified patent and that said Letters Patent is hereby corrected as shown below:

Column 2, line 14, change "weight" to --weigh--.
Column 2, line 29, change "passes" to --passed--.

Signed and Sealed this

Thirtieth Day of April 1985

[SEAL]

Attest:

DONALD J. QUIGG

Attesting Officer    Acting Commissioner of Patents and Trademarks